United States Patent
Gonnet et al.

(10) Patent No.: US 9,956,853 B2
(45) Date of Patent: May 1, 2018

(54) GLASS PANE HAVING A PROFILED JOINT AND TRIM, TRIM AND PRODUCTION METHOD FOR THE GLASS PANE

(71) Applicant: SAINT-GOBAIN GLASS FRANCE, Courbevoie (FR)

(72) Inventors: Romain Gonnet, Lacroix Saint Ouen (FR); Vincent Jamet, Aubervilliers (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days. days.

(21) Appl. No.: 14/909,254

(22) PCT Filed: Jul. 30, 2014

(86) PCT No.: PCT/FR2014/051975
§ 371 (c)(1),
(2) Date: Feb. 1, 2016

(87) PCT Pub. No.: WO2015/015119
PCT Pub. Date: Feb. 5, 2015

(65) Prior Publication Data
US 2016/0185189 A1    Jun. 30, 2016

(30) Foreign Application Priority Data
Aug. 1, 2013  (FR) ...................... 13 57658

(51) Int. Cl.
*B60J 10/00*  (2016.01)
*B60J 1/00*  (2006.01)
(Continued)

(52) U.S. Cl.
CPC ............... *B60J 1/006* (2013.01); *B60J 1/008* (2013.01); *B60J 10/265* (2016.02); *B60J 10/30* (2016.02); *B60J 10/70* (2016.02)

(58) Field of Classification Search
CPC . B60J 1/006; B60J 1/008; B60J 10/265; B60J 10/30; B60J 10/70
See application file for complete search history.

(56) References Cited

U.S. PATENT DOCUMENTS 4,278,286 A * 7/1981 Kiba ............... B60J 10/265
                                                    296/93
4,984,839 A * 1/1991 Miyakawa ........ B60J 1/2002
                                                    296/208
(Continued)

FOREIGN PATENT DOCUMENTS

EP    1 944 182 A1   7/2008
FR    2 104 314 A5   4/1972
(Continued)

OTHER PUBLICATIONS

International Search Report dated Sep. 26, 2014 in PCT/FR14/51975 Filed Jul. 30, 2014.

*Primary Examiner* — Elizabeth A Quast
(74) *Attorney, Agent, or Firm* — Oblon, McClelland, Maier & Neustadt, L.L.P.

(57) ABSTRACT

A glass pane includes a glazed element, at least one profiled joint portion, at least one trim which has an elongate shape and which has a base and at least one wing. The base is located above an outer face of the profiled joint portion. The wing includes, at an end opposite the base, at least one openwork lug. The openwork lug extends through the profiled joint portion via a hole which opens at the outer face and at an inner face of the profiled joint portion. The openwork lug is folded over below the profiled joint portion or below the glazed element.

12 Claims, 6 Drawing Sheets (51) Int. Cl.
*B60J 10/265* (2016.01)
*B60J 10/30* (2016.01)
*B60J 10/70* (2016.01)

(56) References Cited

U.S. PATENT DOCUMENTS

| | | | |
|---|---|---|---|
| 5,451,090 A * | 9/1995 | Brodie | B62D 25/081 |
| | | | 296/192 |
| 6,205,712 B1 | 3/2001 | Ellis | |
| 9,387,744 B2 * | 7/2016 | Grandgirard | B60J 10/27 |
| 9,623,739 B2 * | 4/2017 | Fukuta | B60J 10/32 |
| 2001/0017005 A1 | 8/2001 | Ellis | |
| 2010/0011670 A1 | 1/2010 | O'Sullivan et al. | |
| 2010/0237644 A1 * | 9/2010 | Senge | B60J 10/265 |
| | | | 296/1.08 |

FOREIGN PATENT DOCUMENTS

| | | |
|---|---|---|
| FR | 2 340 217 A1 | 9/1977 |
| WO | 00/06406 | 2/2000 |

* cited by examiner

GLASS PANE HAVING A PROFILED JOINT AND TRIM, TRIM AND PRODUCTION METHOD FOR THE GLASS PANE

CROSS-REFERENCE TO RELATED APPLICATIONS

The present application is a national stage application of International Patent Application No. PCT/FR2104/051975, filed Jul. 30, 2014, and claims priority to French Patent Application No. 1357658, filed Aug. 1, 2013, and the entire contents and disclosure of each application are incorporated by reference herein.

BACKGROUND

The present invention relates to a glass pane comprising a glazed element, at least one profiled joint portion, and at least one trim which has an elongate shape which extends along an edge of the glazed element and which has in cross-section a general shape having a base and at least one wing which extends from the base, the base being located, when the trim is installed on the glass pane, above an outer face of the profiled joint portion and the trim being fixed to the profiled joint portion without any intermediate fixing element.

The present invention also relates to a trim for such a glass pane and the corresponding production method for the glass pane.

In all of the present document, the term "trim" is intended to refer to an accessory of the glass pane, in particular an accessory having an elongate shape; it does not refer to a vehicle bodywork element. Such a trim is used to visually distinguish the edge of the glass pane, when viewed from the outer side; it often has a shiny metal appearance ("chromium-plated") or a colored appearance.

It is known to use trims which are constituted by U-shaped profile-members which are fixed by means of clip-fitting to intermediate clips which are themselves attached to the profiled bead which is produced, for example, from flexible polymer and which is present at the periphery of the glass pane.

There is known from the prior art in this regard the French patent application N° FR 2 340 217. In this document, the intermediate clip is a clip.

It is further known, in particular from some variants set out in the European patent application N° EP 1 944 182, to fix a trim directly to a profiled bead, without any intermediate clip.

This document discloses that at least one retention element, in particular in the form of an arrow, may be introduced into a hole which is provided at the outer face of the joint portion, this hole being able to open at the inner face of the joint portion; however, this retention element is located, in the final position thereof, inside the joint portion: it does not extend completely through the joint portion and does not come into contact with the inner face of the joint portion.

This solution has the advantage of being able to be adopted when the available space between the periphery of the glass pane and the adjacent bodywork is small.

However, the fixing of the trim using this retention element is not sufficiently reliable: even if a plurality of retention elements are provided, the trim can be readily removed since it is sufficient to apply a movement in the same direction but in the opposite sense to the introduction movement of the retention elements into the holes.

BRIEF SUMMARY

An object of the present invention is to overcome the disadvantages of the prior art by providing a trim which can be removably fixed in a simple, rapid and reliable manner to a joint portion and in particular when the space available between the periphery of the glass pane and the adjacent bodywork is small.

A specific object of the invention is to ensure that the trim cannot be disassembled from the glass pane whilst the glass pane is fixed to the bodywork of the vehicle.

The present invention is thus based on a solution according to which the trim is provided with at least one openwork lug and, before the glass pane is fixed to the bodywork, this lug is introduced through a hole which is provided in the profiled bead and which extends completely through the profiled bead, this openwork lug then being folded so as to be applied below the joint portion or below the glazed element.

The openwork lug and the wing which carries it thus both belong to the trim; the openwork lug and the wing which carries it are integral with the base of the trim.

A significant advantage of the invention is the fact that the openwork lug according to the invention, after having been bent, or folded over, has a very small spatial requirement, in particular if it is folded over in a corresponding hollow portion of the profiled bead. In this manner, the invention is particularly recommended when the space available between the edge of the glazed element and the adjacent bodywork is reduced.

The present invention thus relates to a glass pane. This glass pane comprises a glazed element, at least one profiled joint portion, at least one trim which has an elongate shape which extends along an edge of the glazed element and which has in cross-section a general shape having a base and at least one wing which extends from the base, the base being located above an outer face of the profiled joint portion, this glass pane being remarkable in that, when viewed in cross-section (that is to say, transversely relative to the elongate direction), a wing comprises at an end opposite the base at least one openwork lug which extends through the profiled joint portion via a hole which opens at an outer face and at an inner face of the profiled joint portion, the openwork lug being folded over below the profiled joint portion or below the glazed element.

According to the invention, the openwork lug of the trim is thus introduced via the inlet of the hole which is located at the outer face of the joint portion and this lug then emerges from the hole via the inner face of the joint portion in order to be able to be folded over against this inner face of the profiled joint portion or against an inner face of the glazed element and to allow the trim to be maintained below the profiled joint portion so that it remains well-positioned above the profiled joint portion.

The openwork lug forms a localized protuberance on the edge the wing of the trim which carries it.

In this manner, the trim is fixed to the profiled joint portion directly, without any intermediate fixing element and the removable fixing of the trim is simple and reliable.

The openwork lug comprises an aperture, that is to say, a hole which extends from one side to the other of the thickness of the lug; the entire periphery of the hole is surrounded by material of the lug. This hole is preferably in the center of the lug and the periphery of the hole is thus surrounded by a strip of material of the lug and this periphery has a width which is substantially identical around at least half of the periphery of the hole.

Preferably, the wing comprises at an end opposite the base a plurality of openwork lugs which all extend through the profiled joint portion, each via a hole which opens at an outer face and at an inner face of the profiled joint portion, each openwork lug being folded over below the profiled joint portion or below the glazed element.

The openwork lug, or each openwork lug, is preferably in the extension of the wing in order to facilitate the production of the trim; this openwork lug or each openwork lug is preferably integral with the wing; the trim is preferably of a single piece of metal, constituted by a single folded metal sheet (non-laminated), this metal component further being an openwork component.

The openwork lug, or each openwork lug, may extend in the form of an annular arc or in the form of an openwork rectangle or an openwork square in order to facilitate the gripping of the lug in order to fold it below the profiled joint portion or the glazed element; furthermore, preferably, in the case of a rectangle or a square, the corners are rounded in order to increase the retention capacity of the lug.

So that the fixing of the trim is sufficiently reliable, it is preferable for the openwork lug, or each openwork lug, to have a length of between 1 and 5 times the width thereof, the length being considered in this instance in the elongate direction of the trim.

It is possible for the profiled joint portion to have at the inner face thereof a hollow portion having a shape which complements a periphery of the openwork lug which is folded over below the profiled joint portion so that, when the openwork lug has been folded over against the inner face of the joint portion, this lug does not form an excessive thickness which is further inward than the remainder of the inner face of the joint portion. In this manner, when viewed in cross-section, the spatial requirement of the openwork lug is "hidden" in the thickness of the remainder of the joint portion at each side of the openwork lug.

In this instance, it is possible for the hollow portion to comprise a protrusion which has a contour which complements an aperture of the openwork lug in order to further increase the retention capacity of the openwork lug.

The base and at least the wing which comprises at least one openwork lug are each in the form of an elongate plate. The base is preferably solid, without any openings.

The base and at least the wing which comprises at least one openwork lug are orientated relative to each other by an angle which is not equal to zero and which is preferably close to a right-angle; this angle may be, when the trim is viewed in cross-section, between 60° and 120°; this angle may be rounded. For example, the trim may then be in cross-section generally L-shaped with a rounded angle between the single wing and the base.

When the trim comprises two wings, at least one or even both of which comprise(s) at least one openwork lug, the angle between each wing and the base is an angle which is not equal to zero and which may be close to a right-angle; each angle may be, when the trim is viewed in cross-section, between 60° and 120°; each angle may be rounded. For example, the trim may then be in cross-section generally U-shaped with a rounded angle between each wing and the base.

This U is positioned upside-down on or above the profiled joint portion (that is to say, on or above the outer face of the profiled joint portion) with a hollow portion of the U orientated toward the profiled joint portion.

Preferably, a portion of the inner face of the base of the U of the trim is in contact with a portion of the outer face of the profiled joint portion, in particular along an outermost portion of a protrusion of the profiled joint portion.

The wing, or the wings, extend(s) from the base; the base and the wing or the wings are thus connected to each other in order to form the trim.

When the trim comprises two wings, the distal wing is the wing of the trim which is furthest away from the glazed element in the assembled state.

According to the invention, when the openwork lug is folded over, it forms a fold; in this manner, when viewed in cross-section of the trim, there is an angle between the folded-over openwork lug and the wing which comprises this openwork lug. This angle is not equal to zero and is preferably close to a right-angle; this angle, when the trim is viewed in cross-section after folding, may be between 60° and 120°; this angle may be rounded.

In a first independent variant, when viewed in cross-section, in particular at the location of the presence of an openwork lug, the trim is generally U-shaped, with a first wing which comprises at least one openwork lug and a second wing of the U which is introduced into a cavity (different from the hole into which the openwork lug is introduced) which is provided in the outer face of the profiled joint portion, the cavity not opening at the inner face of the profiled joint portion in order to produce with this cavity a counter-reaction support when the openwork lug is folded over against the inner face of the joint portion or against the glazed element.

In this first variant, it is possible for the second wing to be proximal, that is to say, closest to the glazed element in the assembled state, and for the first wing to be distal, that is to say, furthest from the glazed element in the assembled state, so that the distal wing is easier to fold over below the profiled joint portion; however, it is also possible for the reverse arrangement to be carried out.

In a second independent variant, when viewed in cross-section, in particular at the location of the presence of an openwork lug, the trim is generally L-shaped, with the base which is introduced into a cavity which is provided in the outer face of the profiled joint portion and which does not open at the inner face of the profiled joint portion. This cavity also provides a counter-reaction support when the openwork lug is folded over against the inner face of the joint portion or against the glazed element.

In a third independent variant, when viewed in cross-section, in particular at the location of the presence of an openwork lug, the trim is generally U-shaped, having a first wing which comprises at an end opposite the base at least a first openwork lug, the first openwork lug extending through the profiled joint portion via a hole which opens at an outer face and at an inner face of the profiled joint portion, the first openwork lug being folded over below the profiled joint portion or below the glazed element, and a second wing which comprises at an end opposite the base at least a second openwork lug, the second openwork lug extending through the profiled joint portion via a hole which opens at an outer face and at an inner face of the profiled joint portion, the second openwork lug being folded over below the profiled joint portion or below the glazed element, the openwork lug of the second wing preferably being folded over in an opposite sense to the openwork lug of the first wing.

In this manner, in this third variant, the openwork lugs oppose any rotation of the trim about itself; the retention being greatest when two openwork lugs are folded over in the opposite sense.

In this third variant, when viewed in cross-section, the first wing is located at a first end of the base and the second wing is located at a second end of the base, opposite the first end of the base.

These three variants are not mutually exclusive since it is possible for a trim to comprise one variant at one location and another variant at another location, or even another variant at another location.

In a further preferred manner, when viewed in cross-section, an inner face of the trim is located against a protrusion which is produced at the outer face of the profiled joint portion in order to provide a counter-reaction support when the lug is folded over against the inner face of the joint portion or against the glazed element.

It is also possible for the trim to comprise more than two wings; for example, the trim may be generally U-shaped with, approximately at the center of the base, a third wing which extends from the base, at the same side as the two others. It is possible to provide this third wing with an openwork lug or several openwork lugs. Optionally, only this third wing comprises openwork lugs. If a plurality of openwork lugs are used, it is possible to fold over at least one openwork lug in the direction of the glazed element and at least one openwork lug opposite the glazed element in order to achieve better retention of the trim.

The present invention also relates to a trim for a glass pane according to the invention, having an elongate shape and in cross-section a general shape having a base and at least one wing which extends from the base, when viewed in cross-section, a wing which comprises at an end opposite the base at least one openwork lug and preferably a plurality of openwork lugs; this wing may be a proximal wing and/or a distal wing.

The present invention also relates to a production method for a glass pane according to the invention, the glass pane comprising a glazed element, at least one profiled joint portion, at least one trim which has an elongate shape which extends along an edge of the glazed element and which has in cross-section a general shape which has a base and at least one wing which extends from the base, this method being remarkable in that the profiled joint portion has a previously formed hole which opens at an outer face and at an inner face of the profiled joint portion and in that, when viewed in cross-section (relative to the elongate direction), a wing comprises at an end opposite the base at least one openwork lug which is introduced into the previously formed hole of the profiled joint portion and which is then folded over below the profiled joint portion or below the glazed element; the lug is thus folded over against the inner face of the profiled joint portion or against an inner face of the glazed element.

The hole of the joint portion in which the openwork lug is introduced is preferably formed when the profiled joint portion is produced in order to facilitate the production of the glass pane, in particular when this profiled joint portion is produced using an encapsulation technique.

However, the present invention can also be used in the case of a prefabricated joint portion which is then adhesively-bonded to the glazed element, preferably with a local modification of the general profile of the joint portion at the location provided for by the or each open-work lug.

BRIEF DESCRIPTION OF THE DRAWINGS

Several embodiments of the present invention will be described below, by way of non-limiting example, with reference to the appended drawings, in which.

In these Figures, the proportions between the different elements are complied with in each Figure but the elements in the background are generally not illustrated in order to facilitate the reading thereof.

DETAILED DESCRIPTION

The present invention relates to a glass pane 1, and in particular a glass pane of a vehicle, comprising a glazed element 2, at least one profiled joint portion 3 which is fixed to the glazed element, at least one fitted component, such as a trim 4 which is fixed directly to the profiled joint portion 3; for the invention, there is no intermediate fixing component which would be fixed, at one side, to the trim 4 and, at the other side, to the profiled joint portion 3, between these two elements.

The glass pane 1 according to the invention which is illustrated is a fixed rear lateral glass pane of a motor vehicle (rear quarter panel). It comprises a glazed element 2 which is provided with a portion of a profiled bead 3 of a flexible polymer material which completely surrounds the glazed element 2.

The glass pane 1 which optionally comprises one (or more) accessory(ies) and in particular one (or more) glass pane fixing accessory(ies) is intended to close a sliding window which produces a separation between an inner space of the vehicle and an outer space with respect to the vehicle. The glazed element 2 thus has an outer face 22 which is intended to be directed toward the outer space, an inner face 23 which is intended to be directed toward the inner space, and a peripheral edge 21.

The glazed element may be monolithic, that is to say, constituted by a single sheet of material, or be composite, that is to say, constituted by a plurality of sheets of material between which there is inserted at least one layer of adhesive material in the case of laminated glass panes. The sheet(s) of material may be mineral, in particular of glass, or organic, in particular of plastics material.

In the case of a glass pane for a vehicle, the glass pane generally has at least partially at the periphery thereof a decorative strip (not illustrated).

When the glazed element is of organic material, it has been produced before the invention is carried out by means of molding the constituent material of the glazed element in a molding device which comprises a mold which comprises at least one fixed mold portion and one movable mold portion which can be moved relative to the fixed mold portion, the mold portions cooperating in the closed state of the mold, during the molding step, in order to form a molding cavity which in cross-section has the cross-sectional shape of the glazed element. Often the glazed element of organic material is not planar but is instead curved.

When the glazed element is of mineral material, it has been produced before the invention is carried out by means of melting mineral material to form a planar sheet, then cutting this sheet and optionally curving and/or dip-coating this sheet.

In the Figures, the glazed element 2 is a monolithic glass pane. The glass pane illustrated is a fixed glass pane, but the present invention may also apply to a movable glass pane.

The portion of the profiled joint 3 thus has an outer face 31 which is intended to be orientated toward the outer side of the vehicle, and an inner face 32 which is intended to be orientated toward the inner side of the vehicle.

The polymer material which constitutes the profiled bead 3 may be a thermoplastic material (PVC, TPE, etc.), a polyurethane or a synthetic rubber of the EPDM type or any other appropriate material.

The profiled bead 3 is preferably produced by carrying out a production method which is referred to as "encapsulation" since it comprises a step of molding the profiled bead 3 in a molding device, between two molding elements, a molding element which receives the inner face of the glass pane and a molding element which receives the outer face of the glass pane, these two molding elements being closed one on the other during the molding step whilst producing between them a molding cavity which is filled with the constituent material of the profiled bead during the step of molding this bead.

The profiled bead 3 is preferably arranged over the entire periphery of the glass pane 1 but this profiled bead could very well be positioned only over a portion of the periphery of the glass pane or over any portion of the glass pane.

The trim 4 has an elongate shape which extends along an edge of the glazed element and which has in cross-section a general shape having a base 40 and at least one wing 41 which extends from the base at an angle which is not equal to zero, the base being located above an outer face 32 of the profiled joint portion 3.

In the Figures, the trim 4 thus covers a portion of the outer face 32 of the profiled joint and in particular a protrusion 31.

It is in order to improve the aesthetic appearance of the glass pane that a portion of the profiled bead 3 which can be seen from the outer side of the vehicle is covered by the trim 4.

The trim is pre-fabricated: it has been produced, and optionally shaped, prior to being fixed to the glass pane. It may be aluminum, aluminum alloy, steel and in particular stainless steel.

The material from which it is constituted preferably has an elasticity modulus of between $60 \cdot 10^3$ MPa and $250 \cdot 10^3$ MPa in order to allow a plastic deformation to be applied manually to the openwork lug(s).

The trim has a complex shape: it has in cross-section a shape having a central base 40 and at least one wing 41, 41' which extends from the base. This shape is positioned upside-down with the base located at the top, or to be specific in this instance on the outer face of the profiled joint portion 3 in order to cover the protrusion 31. The inner face 42 of the trim is thus in contact with the outer face 31 of the profiled joint portion 3 at least over the outermost portion of the protrusion 31.

Figure 2:
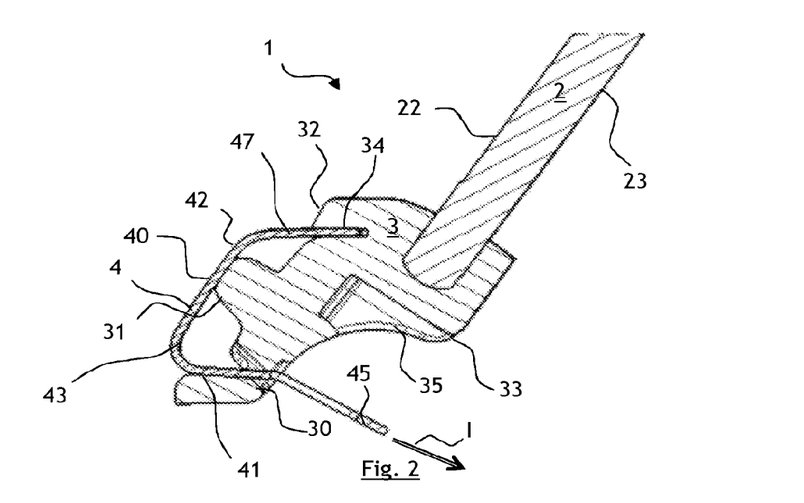
FIG. 2 is a partial cross-section of the same glass pane as in FIG. 1.
Figure 3:
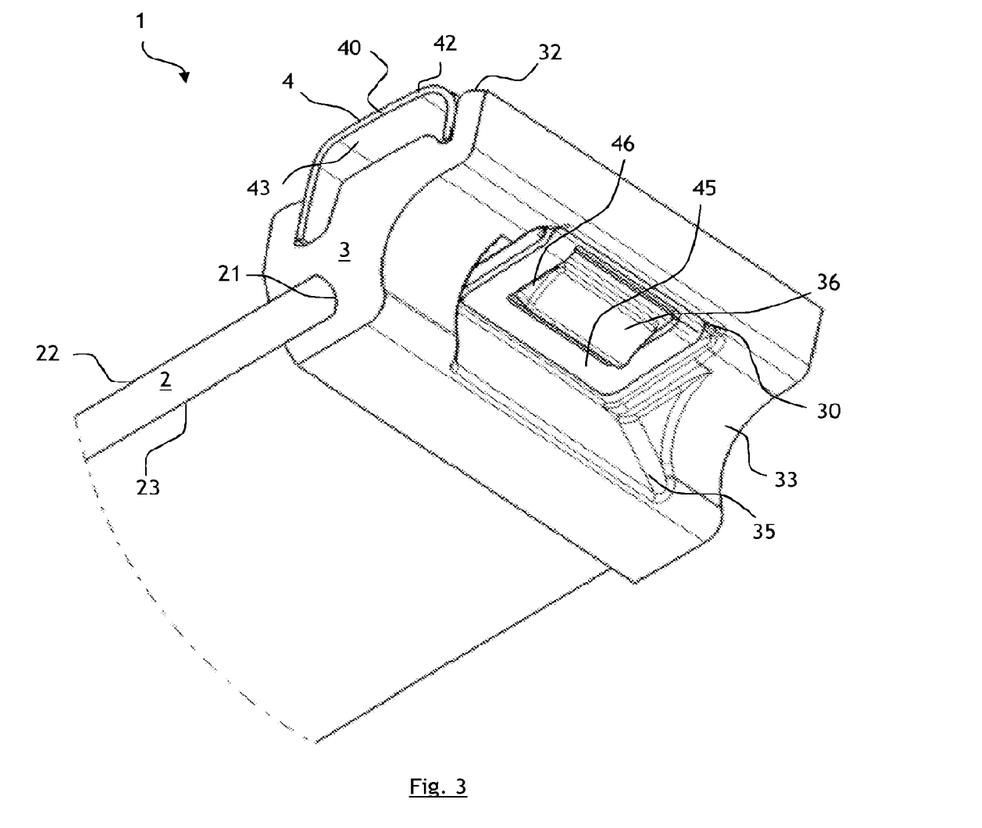
FIG. 3 is a partial, perspective view from the inner side of the same glass pane as in FIG. 1 when the openwork lug of the trim is folded over below the profiled joint portion.
Figure 4:
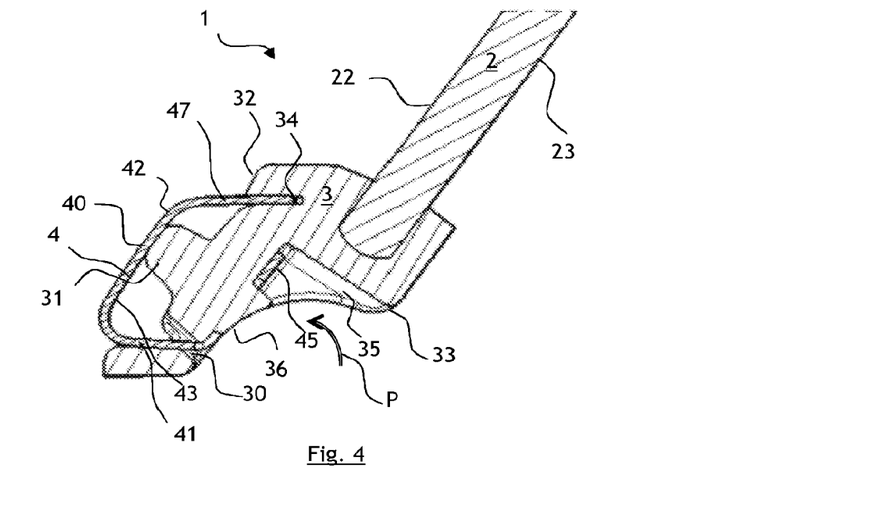
FIG. 4 is a partial cross-section of the same glass pane as in FIG. 3.

According to the invention, when viewed in cross-section (that is to say, transversely relative to the elongate direction of the trim, as in FIGS. 2 and 4), a distal wing 41 of the trim comprises at an end opposite the base 40 at least one openwork lug 45 and preferably a plurality of openwork lugs 45.

Figure 1:
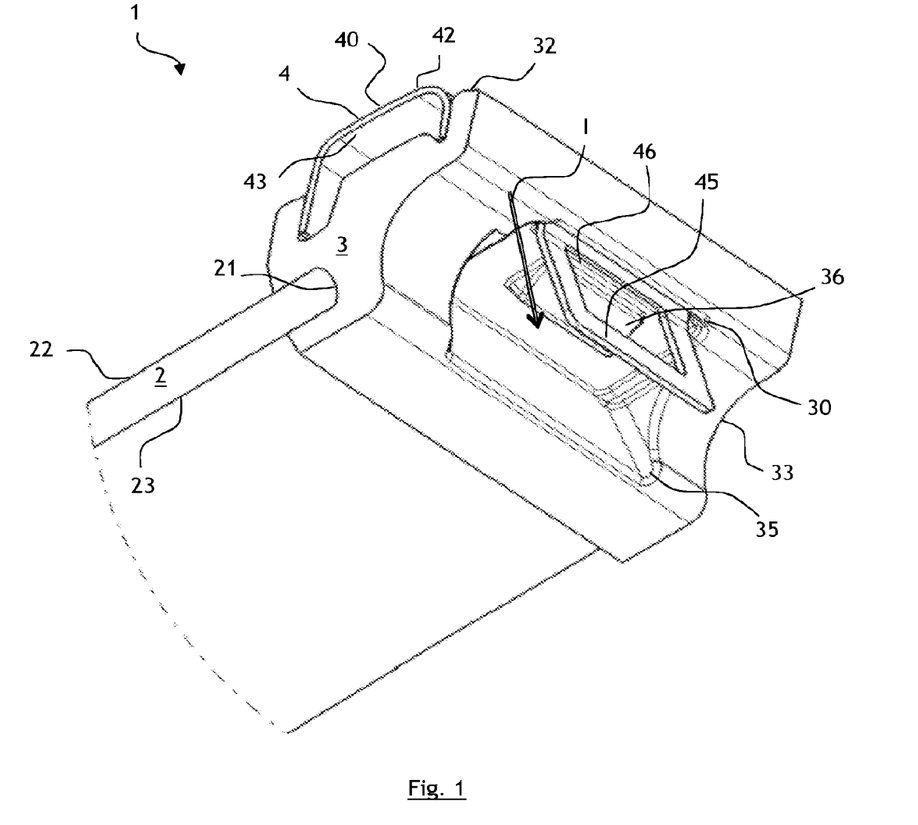
FIG. 1 is a partial, perspective view from the inner side of a first variant of a glass pane according to the invention when an openwork lug of a trim is introduced into the hole provided in the profiled bead.

The openwork lug 45, and preferably each openwork lug 45, thus comprises an aperture 46 which can be seen in particular in FIG. 1, or in other words an opening, that is to say, a hole which is provided in the thickness of the openwork lug.

According to the invention, when there is only one openwork lug 45, in order to fix the trim 4 to the profiled joint portion 3, the openwork lug 45 is introduced, as illustrated by the arrow I in FIGS. 1 and 2, into the previously formed hole 30 of the profiled joint portion 3 and the openwork lug is then folded over below the profiled joint portion 3, as illustrated by the arrow P in FIG. 4, against the inner face of the profiled joint portion.

The folding-down movement of the openwork lug which is similar to a folding action extends in this instance over approximately 90°.

It is also possible for the openwork lug to be folded over below the glazed element (not illustrated).

According to the invention, when there are a plurality of openwork lugs 45, in order to fix the trim 4 to the profiled joint portion 3, all the openwork lugs 45 are introduced together, each one into each previously formed hole 30 of the profiled joint portion 3, respectively, and the lugs are then each folded over below the profiled joint portion 3, against the inner face of the profiled joint portion, or below the glazed element.

The hole 30, or each hole 30, is preferably formed during the production of the profiled joint portion 3; however, since this/these hole(s) is/are relatively simple since it is a/they are simple aperture(s), it is possible to produce it/them following production of the profiled joint portion.

As can be seen in the Figures, the openwork lug 45, or each openwork lug, is in the extension of the wing which carries it and it is in this instance preferably integral with the wing which carries it; the trim comprises in this instance a single metal component, constituted by a single metal sheet (not laminated) which has a thickness, for example, of from 0.4 mm to 2 mm and which is folded, this metal component further being openwork at the center of the openwork lug or at the center of each openwork lug if there are several of them.

The aperture 46 has a rectangular shape, but it could also be square-shaped, round-shaped, or in the form of a circle portion (for example, a semi-circle). The corners of the square are rounded in order to increase the retention capacity of the lug, without risking damage to the material of the profiled joint portion.

Figure 5:
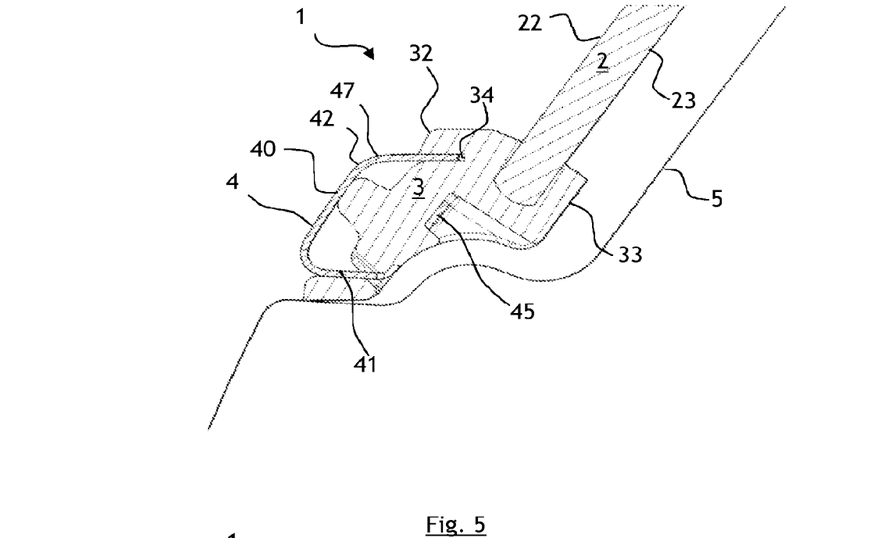
FIG. 5 is a partial cross-section equivalent to FIG. 4 illustrating the glass pane according to the invention in the state assembled against a bodywork portion.
Figure 6:
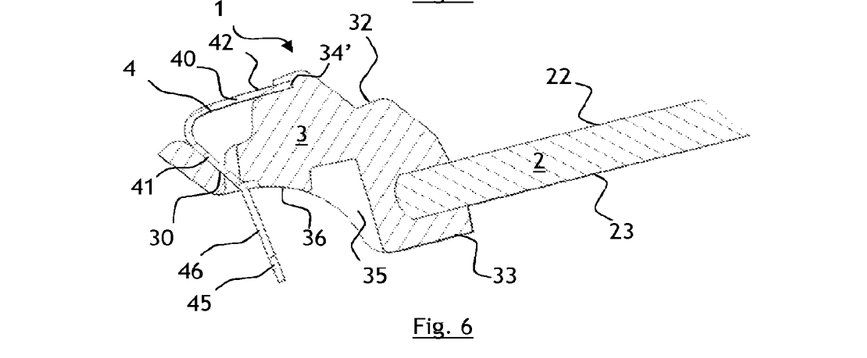
FIG. 6 is a partial cross-section equivalent to FIG. 1 for a second production variant of the invention.

FIG. 5 shows that, in proportion, the thickness of the profiled bead 3 is relatively small; this illustrates in particular the advantage of the invention for the configurations where the space available between the edge 21 of the glazed element and the adjacent bodywork 6 is small.

Figure 7:
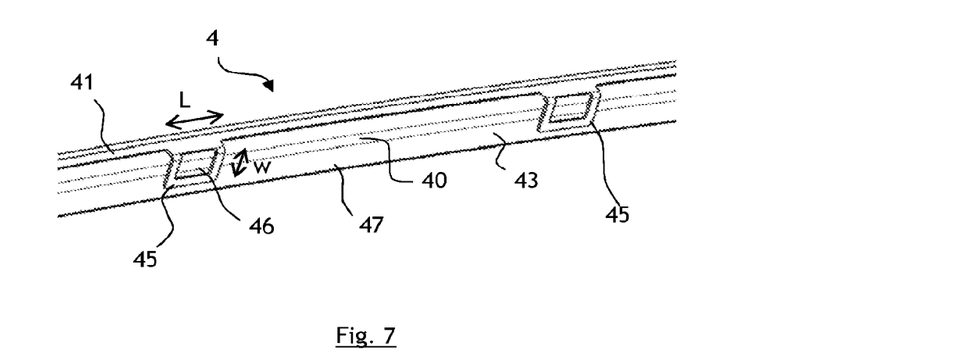
FIG. 7 is a partial, perspective view from below of a trim according to the invention having two openwork lugs which are positioned on a wing of a trim (the wings being folded over, in this instance in two identical directions and two identical senses, for the purposes of the illustration)

As can be seen in FIG. 7, the openwork lug 45, or each openwork lug, preferably has a length L of between 1 and 5 times the width w thereof.

The Figures further show that the profiled joint portion 3 has in the inner face 33 a hollow portion 35 which has a shape which complements a periphery the openwork lug 45 which is folded over below the profiled joint portion 3 in order to reduce the spatial requirement.

This hollow portion 35 further comprises in this instance a protrusion 36 having a contour which complements the aperture 46 of the openwork lug 45 and which more specifically complements the contour of the aperture 46. The thickness of this protrusion is preferably at least equal to, and preferably greater than, the thickness of the openwork lug.

When an openwork lug is folded, the important aspect is that the openwork lug is folded over so that it is located inside the general profile of the profiled bead.

FIGS. 2 and 4 further show that, when viewed in cross-section at the location of the presence of an openwork lug, according to a first variant of the invention, the trim 4 is generally U-shaped, with a first wing 41 which comprises at least one openwork lug 45 and a second wing 47 of the U of the trim which is introduced into a cavity 34 which is provided in the outer face 32 of the profiled joint portion 3, the cavity not opening at the inner face 33 of the profiled joint portion 3.

This second wing 47 is preferably the wing of the proximal U which is closest to the glazed element in the assembled state and the first wing 41 is the wing of the distal U furthest away from the glazed element in the assembled state so that the distal wing is easier to fold over below the profiled joint portion 3; however, it is possible for this to be reversed.

After the openwork lug 45 has been folded over against the inner face 33, the trim is fixed by being gripped between this inner face 33 (by the openwork lug 45 which is in the hollow portion 35 with the protrusion 36 which is in the aperture 46) and the cavity 34.

FIG. 5 shows a second variant, when viewed in cross-section at the location of the presence of an openwork lug, for which the trim 4 is generally L-shaped, with the base 40 which is introduced into a cavity 34' which is provided in the outer face 32 of the profiled joint portion 3, this cavity 34' not opening at the inner face 33 of the profiled joint portion 3.

FIG. 5 shows an embodiment according to which the openwork lug 45 is folded over below the profiled joint portion 3, but before this openwork lug is folded over; the folding over is the same as for the first variant.

After the openwork lug 45 has been folded over against the inner face 33, the trim is fixed by being gripped between this inner face 33 (via the openwork lug 45 which is in the hollow portion 35 with the protrusion 36 which is in the aperture 46 and the cavity 34'.

As shown in FIG. 7, it is possible for a first wing 41 to comprise a plurality of openwork lugs 45.

Figure 8:
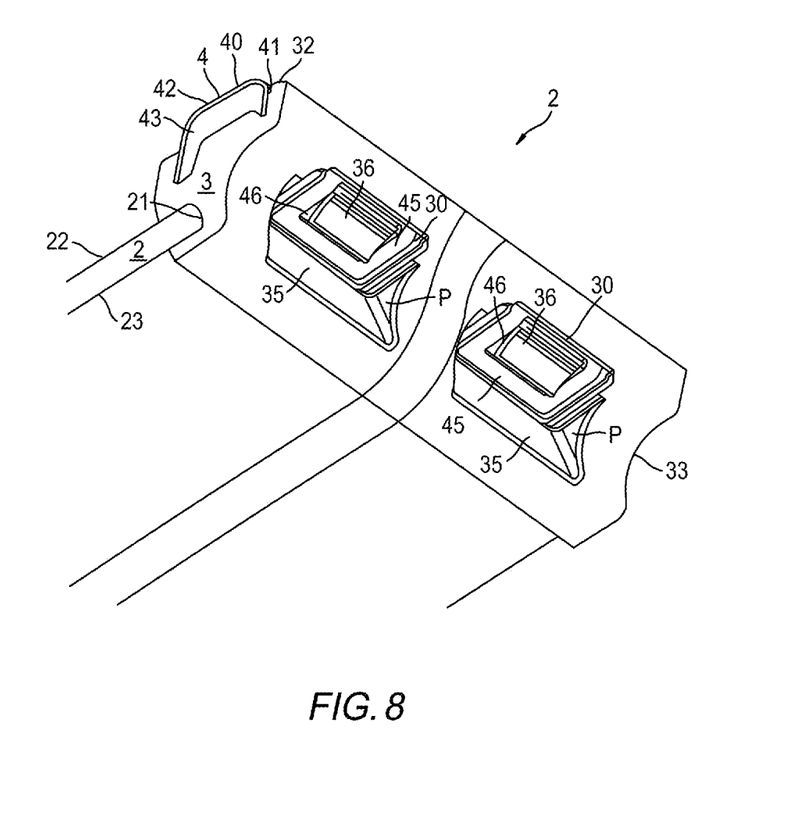
FIG. 8 is a partial, perspective view from the inner side of a glass pane which comprises the trim of FIG. 7 with the two wings folded over in two identical directions and two identical senses.

In this FIG. 7, the trim portion is illustrated in a rectilinear manner. FIG. 8, which is a bottom view of the trim of FIG. 7 in the installed state, shows that the folding-down movement P of the openwork lugs is orientated in the same manner in space and is brought about in the same sense.

However, it is completely possible for the trim to be curved and to be present on two adjacent sides of the glazed element, or even on three sides of the glazed element, or even all the way around the glazed element.

It is possible to optimize the retention produced by the openwork lugs in accordance with their respective positions in space in order to have a retention action in the three dimensions of space.

Figure 9:
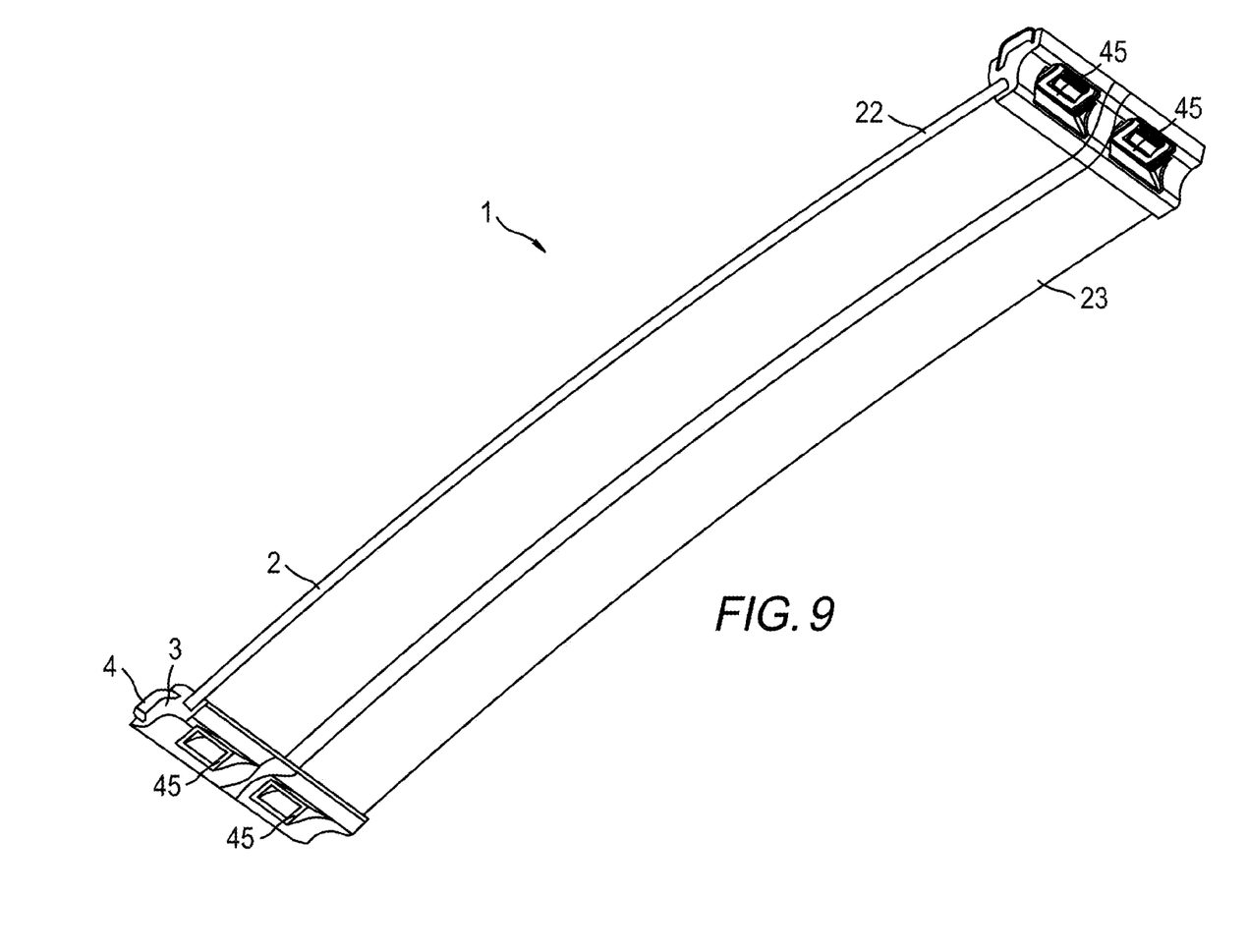
FIG. 9 is a partial, perspective view from the inner side of a glass pane which comprises the trim of FIG. 7 which extends along two opposing edges of the glazed element.

FIG. 9 shows the retention along two opposing edges of a glazed element of a single trim 4; in this Figure, four openwork lugs are illustrated. In this configuration, the folding-down movement of the openwork lugs is orientated in the same manner in space and is brought about in the same direction but in the lower portion (at the left-hand side in the Figure) it is brought about in the opposite sense with respect to the upper portion.

Figure 10:
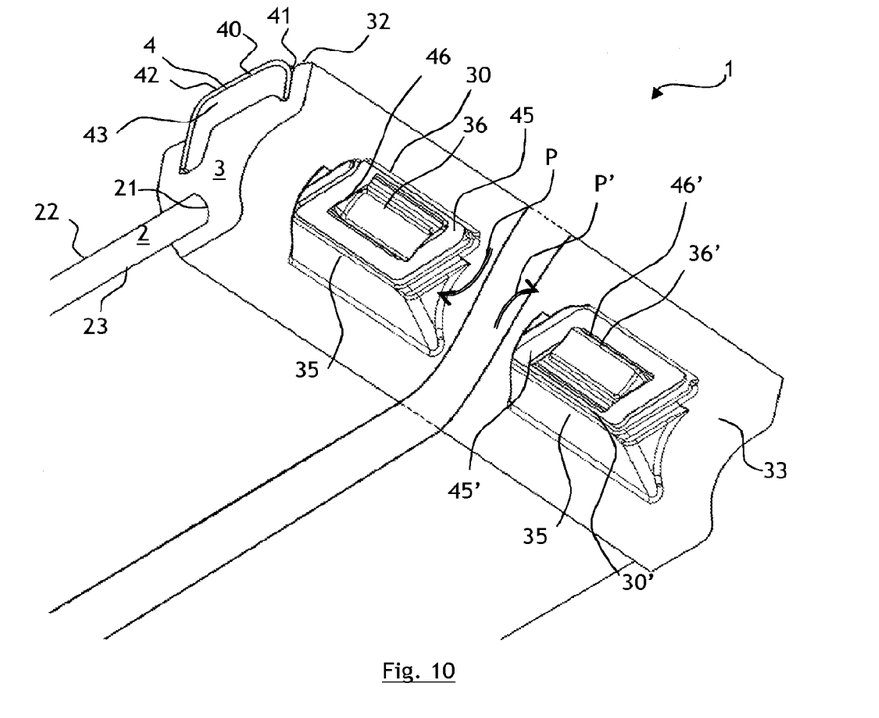
FIG. 10 is a cross-section equivalent to FIG. 1 for a third production variant of the invention having two openwork lugs which are carried by two different wings.
Figure 11:
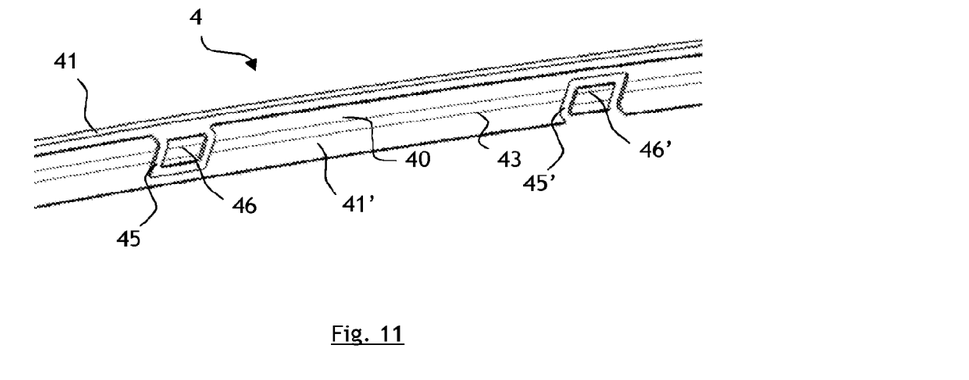
FIG. 11 is a partial, perspective view from below of a trim according to the invention having two openwork lugs which are positioned on two different wings of a trim (the wings being folded over, in this instance in two identical directions and two opposing senses, for the purposes of the illustration).

FIGS. 10 and 11 show a third variant of the invention, when viewed in cross-section at the location of the presence of an openwork lug, for which the trim 4 is generally U-shaped, having as in the first variant, a first wing 41 which comprises at an end opposite the base 40 at least a first openwork lug 45, the first openwork lug 45 extending through the profiled joint portion 3 via a hole 30 which opens at the outer face 32 and at the inner face 33 of the profiled joint portion 3, the first openwork lug 45 being folded over below the profiled joint portion 3, and a second wing 41' which also comprises at an end opposite the base 40, at least a second openwork lug 45', the second openwork lug 45' also extending through the profiled joint portion 3 via a hole 30' which is similar to the hole 30 with the exception that it is not positioned at the same location relative to the glazed element and which opens at the outer face 32 and at the inner face 33 of the profiled joint portion 3, the second openwork lug 45' being folded over below the profiled joint portion 3.

FIGS. 10 and 11 show that the openwork lug 45' of the second wing 41' is folded over in accordance with a movement P' in the same direction but in an opposite sense to the folding-down movement P of the openwork lug 45 of the first wing 41; however, it is possible for the openwork lug 45' of the second wing 41' to be folded over in the same direction and in the same sense as the openwork lug 45 of the first wing 41; in this instance, for example, the openwork lug 45' of the second wing 41' can be folded over below the glazed element 2.

The invention claimed is:
1. A glass pane comprising:
a glazed element;
at least one profiled joint portion; and
at least one trim which has an elongate shape which extends along an edge of the glazed element and which has in cross-section a general shape having a base and at least one wing including a first wing which extends from the base at an angle which is not equal to zero, the base being located above an outer face of the at least one profiled joint portion, wherein, when viewed in cross-section, the first wing comprises, at an end opposite the base, at least one openwork lug, the at least one openwork lug including an aperture extending through a thickness of the at least one openwork lug, the at least one openwork lug extending through the at least one profiled joint portion via a hole which opens at the outer face and at an inner face of the at least one profiled joint portion, the at least one openwork lug being folded over below the at least one profiled joint portion or below the glazed element, and a protrusion of the trim passes through the aperture of the at least one openwork lug.

2. The glass pane as claimed in claim 1, wherein the at least one openwork lug extends in the form of an annular arc or in the form of an openwork rectangle or an openwork square.

3. The glass pane as claimed in claim 1, wherein the at least one openwork lug has a length of between 1 and 5 times a width thereof.

4. The glass pane as claimed in claim 1, wherein the at least one profiled joint portion has, at the inner face, a hollow portion having a shape which complements a periphery of the at least one openwork lug which is folded over below the at least one profiled joint portion.

5. The glass pane as claimed in claim 1, wherein, when viewed in cross-section, the at least one trim is generally U-shaped, including the first wing which comprises the at least one openwork lug and a second wing which is introduced into a cavity which is provided in the outer face of the at least one profiled joint portion and which does not open at the inner face of the at least one profiled joint portion.

6. The glass pane as claimed in claim 1, wherein, when viewed in cross-section, the at least one trim is generally L-shaped, with the base which is introduced into a cavity which is provided in the outer face of the at least one profiled joint portion and which does not open at the inner face of the at least one profiled joint portion.

7. The glass pane as claimed in claim 1, wherein, when viewed in cross-section, the at least one trim is generally U-shaped, and includes
the first wing, which comprises, at the end opposite the base, the at least one openwork lug, the at least one openwork lug being a first openwork lug, and
a second wing which comprises, at an end opposite the base, at least a second openwork lug, the second openwork lug extending through the at least one profiled joint portion via another hole which opens at the outer face and at the inner face of the at least one profiled joint portion, the second openwork lug being folded over below the at least one profiled joint portion or below the glazed element,
the second openwork lug being folded over in an opposite direction to the first openwork lug.

8. The glass pane as claimed in claim 1, wherein, when viewed in cross-section, an inner face of the at least one trim is located against a protrusion which is produced at the outer face of the at least one profiled joint portion.

9. The glass pane as claimed in claim 1, wherein a thickness of the protrusion is equal to or greater than the thickness of the at last one openwork lug.

10. The glass pane as claimed in claim 1, wherein the aperture of the at least one openwork lug is rectangular.

11. A glass pane comprising:
a glazed element;
at least one profiled joint portion; and
at least one trim which has an elongate shape which extends along an edge of the glazed element and which has in cross-section a general shape having a base and at least one wing including a first wing which extends from the base at an angle which is not equal to zero, the base being located above an outer face of the at least one profiled joint portion,
wherein, when viewed in cross-section, the first wing comprises, at an end opposite the base, at least one openwork lug, the at least one openwork lug extending through the at least one profiled joint portion via a hole which opens at the outer face and at an inner face of the at least one profiled joint portion, the at least one openwork lug being folded over below the at least one profiled joint portion or below the glazed element, and
wherein when viewed in cross-section, the at least one trim is generally U-shaped, including the first wing which comprises the at least one openwork lug and a second wing which is introduced into a cavity which is provided in the outer face of the at least one profiled joint portion and which does not open at the inner face of the at least one profiled joint portion.

12. A glass pane comprising:
a glazed element;
at least one profiled joint portion; and
at least one trim which has an elongate shape which extends along an edge of the glazed element and which has in cross-section a general shape having a base and at least one wing including a first wing which extends from the base at an angle which is not equal to zero, the base being located above an outer face of the at least one profiled joint portion,
wherein, when viewed in cross-section, the first wing comprises, at an end opposite the base, at least one openwork lug, the at least one openwork lug extending through the at least one profiled joint portion via a hole which opens at the outer face and at an inner face of the at least one profiled joint portion, the at least one openwork lug being folded over below the at least one profiled joint portion or below the glazed element, and
wherein, when viewed in cross-section, the at least one trim is generally L-shaped, with the base which is introduced into a cavity which is provided in the outer face of the at least one profiled joint portion and which does not open at the inner face of the at least one profiled joint portion.

* * * * *